Nov. 13, 1951          G. WHEAT          2,575,151

BATTERY CHARGING APPARATUS

Filed Oct. 17, 1947          4 Sheets-Sheet 1

Inventor:
Grant Wheat,
by J. H. McCrady,
Attorney.

Nov. 13, 1951     G. WHEAT     2,575,151

BATTERY CHARGING APPARATUS

Filed Oct. 17, 1947     4 Sheets-Sheet 2

Inventor:
Grant Wheat,
by J. A. McCready,
Attorney

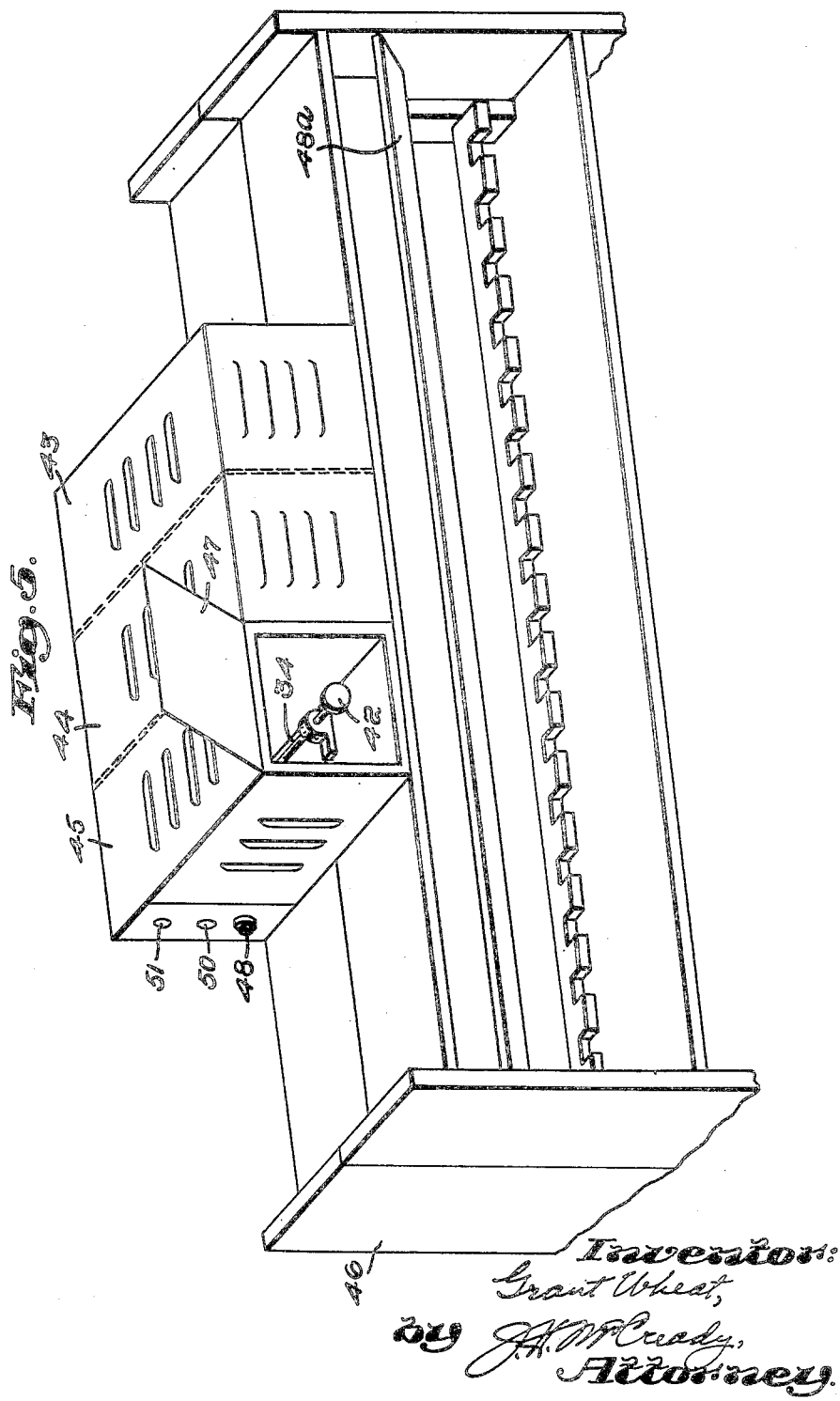

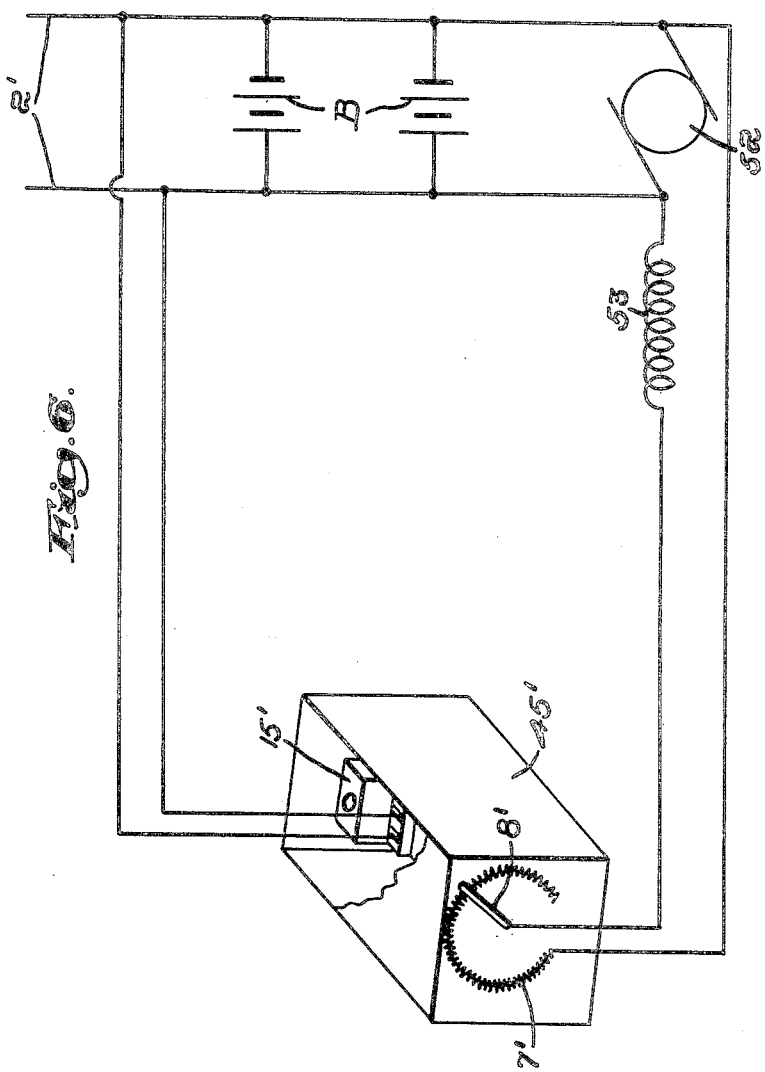

Patented Nov. 13, 1951

2,575,151

UNITED STATES PATENT OFFICE 2,575,151

BATTERY-CHARGING APPARATUS

Grant Wheat, Marlboro, Mass., assignor to Koehler Manufacturing Company, Marlboro, Mass., a corporation of Massachusetts Application October 17, 1947, Serial No. 780,423

4 Claims. (Cl. 320—39)

It is now a very common practice for miners to obtain the light which they need for their work from electric lamps mounted on headpieces detachably secured to the miners' hats or caps. Current for each lamp is supplied by a small storage battery supported on the miners' belt. Before the miners enter the mine to go to work, they take their lamps from the lamp house, with the batteries fully charged, and as they leave the mine they place the lamps in racks equipped to charge the batteries while they are not being used. In earlier patents I have disclosed lamp racks designed for this purpose, the arrangement being such that each battery is connected into the charging circuit automatically by the act of placing it properly in the rack.

In a charging system organized to charge the batteries in parallel, the voltage across each battery should be maintained substantially constant. This means that the voltage supplied to the circuit must be varied with any substantial variation in the number of batteries in that circuit, and with the condition of the charge in those batteries. For example, if at the end of a shift seventy-five (75) batteries are placed on charge in a rack in a period of fifteen (15) or twenty (20) minutes, each battery having a relatively low charge in it, then an increase in both the voltage and the amperage will be required during the first few hours of charging, and the current required will be gradually reduced as the batteries become more fully charged. Thus, to maintain the desired condition in the charging circuit requires the attention of a man in the lamp-house to make the necessary adjustments. Also, whether these conditions are maintained or not, depends upon the reliability of that attendant. In small mines, where a relatively small number of miners are employed, such attention involves a substantial item of expense and there is a strong temptation to get along without it.

The present invention aims to devise an automatic system with which the necessity for such attention will not only be eliminated but in which the necessary adjustments will be produced automatically and with a degree of accuracy far greater than could be expected simply from hand operation.

The nature of the invention will be readily understood from the following description when read in connection with the accompanying drawings, and the novel features will be particularly pointed out in the appended claims.

In the drawings,

Fig. 5 is a perspective view of the top of a charging rack in which the miners' lamps are supported, and showing the casings illustrated in Fig. 4 as they are customarily supported on said rack; and Fig. 6 is a diagrammatic view showing a modification.

Figure 1:
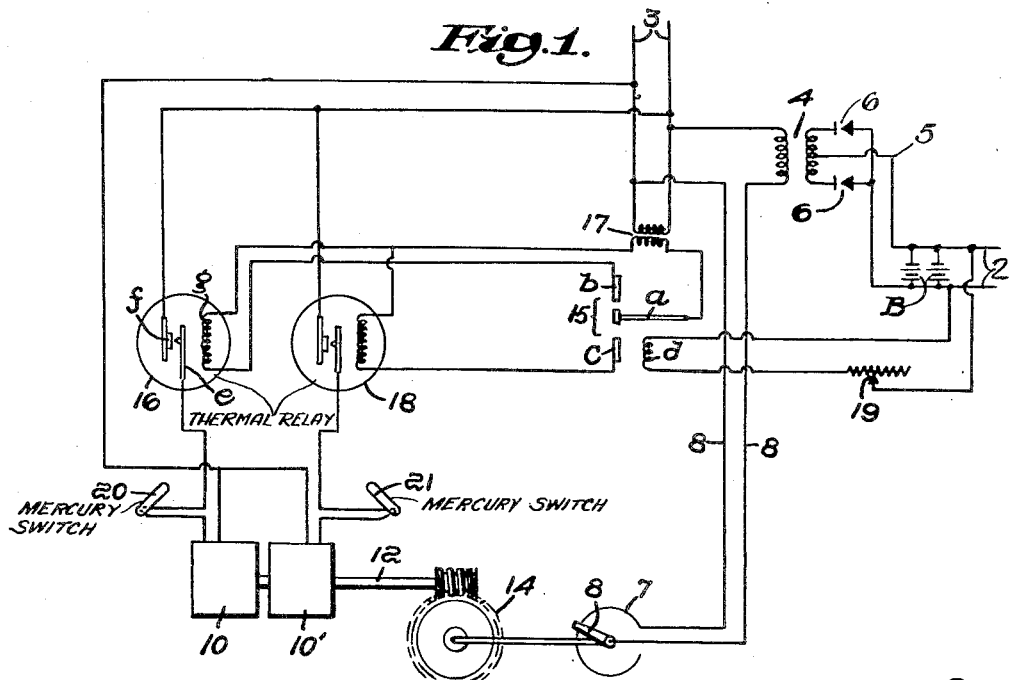
Fig. 1 is a wiring diagram showing the general organization of the charging circuit and the current supply means therefor.

For purposes of disclosure it will here be assumed that the miners' lamps are of the type disclosed in my Patent No. 2,312,614, dated March 2, 1943. Parts of a lamp rack suitable for receiving the headpieces and batteries of these lamps is shown in Figs. 1 and 11 of that patent, it being understood that the headpieces are supported in the manner illustrated in Fig. 1 and that each stall is equipped with contacts like those shown in Fig. 11 for connecting the headpieces and batteries of a number of lamps in parallel across a charging circuit. The manner in which these connections are made is fully disclosed in said patent.

In the drawings of the present application the parallel conductors of such a charging circuit are indicated at 2, Fig. 1, with a plurality of batteries B connected in parallel across them. Power for the charging operation is derived from an alternating current supply line 3 and a transformer 4 connected to it. As illustrated, the secondary of this transformer has a middle tap 5 connected to one side of the charging circuit 2 while the two ends of the secondary coil of the transformer are connected in parallel through dry-plate rectifiers 6—6 to the other side of said charging circuit.

For the purpose of maintaiinng a substantially constant potential across the charging circuit, a novel controlling or regulating apparatus is provided comprising a rheostat 7, or equivalent resistance or impedence unit, connected in series with the primary of the transformer by conductors 8—8, and power-driven means, responsive to variations in the voltage across said charging circuit, is arranged to adjust said resistance in such a manner as to vary the current flowing through the primary coil as required to correct variations in voltage in the charging circuit. The resistance unit used at the point 7 may either be a non-inductive resistance or an impedence, as desired. Usually it is preferable to use a non-inductive resistance. Or, a simple impedence unit consisting of a coil with a core adjustable in it to vary the degree of its inductance may be employed. These elements are equivalents, so far as the present invention is concerned.

Figure 2:
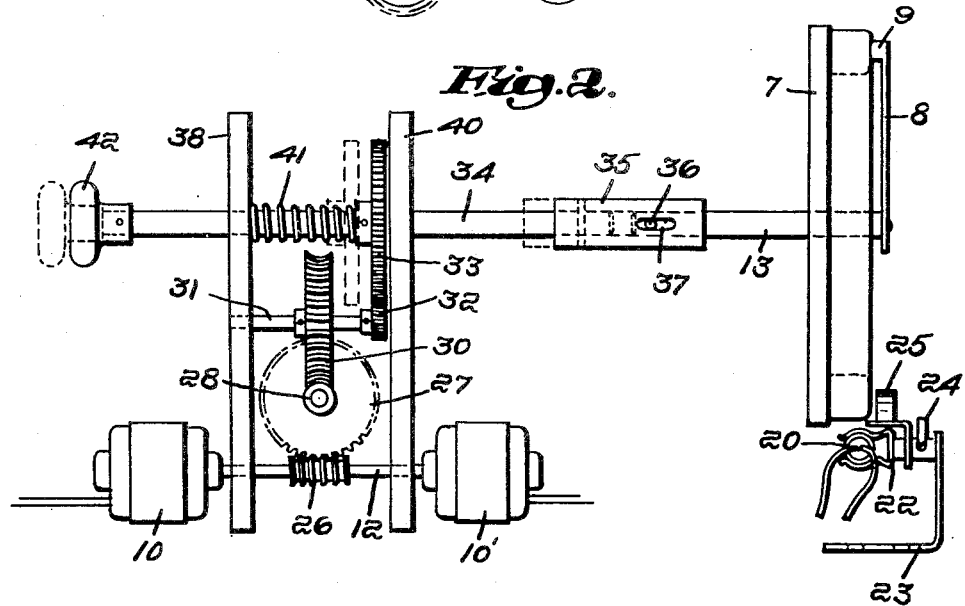
Fig. 2 is a view showing more in detail some of the elements of the arrangement illustrated in Fig. 1.
Figure 3:
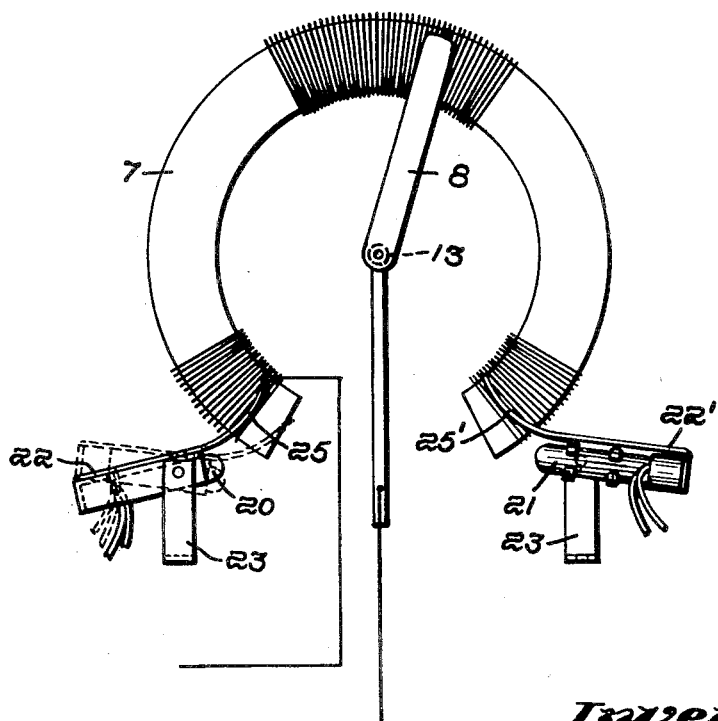
Fig. 3 is a face view of the rheostat illustrated in Figs. 1 and 2.

Referring to Figs. 2 and 3, it will be seen that the rheostat 7 comprises a resistance coil wound around a porcelain core, which is curved about a center. An arm 8 pivoted at said center carries a contact 9 which runs on the front face of the coil. The arrangement is such that when this arm is swung in a clockwise direction, Figs. 1 and 3, more resistance will be cut into the primary circuit and the voltage across it, therefore, will be correspondingly reduced, while rotation of the arm in the opposite direction will have the effect of decreasing the resistance in series with the primary coil and, consequently, raising the voltage across said primary. Such changes also lower or raise the voltage in the charging circuit 2—2.

The invention provides power-driven means for rotating the arm 8 in one direction or the other, as required by the needs of the charging circuit. For this purpose a reversible motor or, preferably, two motors 10—10' mounted end to end on the same shaft 12 and designed to revolve that shaft in opposite directions are provided, these two arrangements being equivalents. The motor shaft is connected with the shaft 13, on which the rheostat arm 8 is secured, through a gear reduction mechanism indicated, in general, at 14 in Fig. 1, the reduction ratio preferably being high, say in the neighborhood of 10,000 or 12,000 to 1, so that the motion of the arm 8 will be relatively slow.

Both motors 10 and 10' can be of small fractional horse-power because the duty required of them is not heavy, and they preferably are of the "shaded pole" type so that they will start easily and the use of brush motors, accordingly, can be avoided. They are connected in parallel across the A.-C. supply line 3, as will be clear from an inspection of Fig. 1, and they are controlled by a very sensitive selector switch or relay indicated at 15. This instrument is essentially a volt meter, the needle or armature $a$ of which oscillates between two contacts $b$ and $c$. The coil $d$ of this instrument is connected across the busses of the charging circuit 2 so that the armature $a$ is highly sensitive to small changes in potential of the charging circuit. Assuming that the normal voltage of the circuit is 5, the relay armature will be in its neutral position and both motors idle when the charging circuit voltage remains at this value, but it may be so set that one motor or the other, as required, will be brought into action when the charging circuit voltage drops below, say, 4.95 or rises to 5.05. In the latter event the needle or armature $a$ touches the upper contact $b$, whereupon the proper motor is brought into operation to swing the arm 8 in a clockwise direction to reduce the voltage. The opposite effect occurs if the armature engages the contact $c$.

Because there is some tendency for these contacts to chatter, I perfer to introduce into the supply circuits for each motor a delayed action relay. As shown in Fig. 1, the current supply circuit for the left-hand motor 10 includes such a relay 16 which comprises a contact carried by a bimetallic strip $e$ and a cooperating stationary contact $f$. These parts are enclosed in an evacuated glass envelope and a heating coil $g$ is positioned in it closely beside the strip $e$, the coil being connected in series with the armature $a$ and contact $b$ of the sensitive relay 15 and also with the secondary coil of a small transformer 17 which supplies current for this control circuit. Consequently, if the voltage rises above a predetermined value in the charging circuit 2, the armature of the sensitive relay will engage the contact $b$, thus causing current to flow through the heating coil $g$. After a lapse of a predetermined interval of time, say in the neighborhood of ten seconds, the contacts $e$ and $f$ will engage each other, thus closing the supply circuit through the left-hand motor 10 and initiating the rotative movement of the rheostat arm 8 in a clockwise direction. The result will be a reduction in the voltage impressed across the primary of the transformer 4, and thereafter a gradual reduction in the voltage of the charging circuit.

When the potential across the charging circuit drops below a predetermined value, the needle $a$ of the sensitive selector relay 15 will swing downwardly into engagement with the contact $c$, whereupon the operations just described will be repeated through the relay 18 and current will be turned on to the right-hand motor 10' through the operation of the delayed action relay which is a duplicate of that shown at 16. Relays suitable for the purposes just described are available commercially. A small variable resistor 19 in series with the coil $d$ of the sensitive relay 15 may be used to adjust the voltage at which the relay will operate.

When the rheostat arm 8 arrives at either end of the rheostat coil, the operating motor which is then moving the arm should be stopped. In the construction shown this result is accomplished by including a mercury switch in one of the supply lines for each of the motors. These switches are indicated, respectively, at 20 and 21 in Fig. 1, and are shown more clearly in Fig. 3. Those shown are of a commercial type, consisting of a sealed and evacuated glass tube with two internal contacts arranged to be connected and disconnected by the flow of a small body of mercury. As shown in Figs. 2 and 3 the tube 20 is mounted in a metal holder 22 which is pivoted on a stand 23 so as to tip between the positions indicated in said figure. Normally it is in the position illustrated in full lines, at which time the contacts are electrically connected together so that the motor current can flow through them. A pin 24 fixed in the pivot shaft, which is rigid with the switch body, works in a slot in a sleeve rigid with the holder and thereby holds the parts against separation axially of the pivot and also limits the range of swing of the switch.

Projecting from one end of the holder is a curved arm 25. When the arm 8 is swung in a counter-clockwise direction to substantially the end of the rheostat coil, the contact 9 engages this arm 25 and swings the mercury switch 20 far enough to cause it to open the circuit of the motor 10 and stop the later. The same action takes place at the opposite end of the swing of the arm where the contact 9 engages the corresponding tail piece 25' of the switch 21, opens it, and stops the motor 10'.

When the apparatus is again brought into action, the arm 8 will be moved in a direction opposite to that in which it was moving when previously stopped so that the fact that one mercury switch remains open does not interfere with the resumption of operation of the control mechanism.

One of these mercury switches which limits the travel of the rheostat arm 8 also is useful for another reason. That is, the switch 21 which is opened at the end of that movement which raises the voltage, serves to limit the load which may be drawn from the rectifier. For example, if a full load of discharged batteries were suddenly thrown on to the charging apparatus, the demand so created might be two or three times the average or normal load. To take care of such a load and still to maintain the charging voltage between the limits above described would require a transformer and rectifiers much larger than those necessary for the normal load and much larger, also, than those required to charge the batteries completely in the normal period available for performing that operation.

Assuming that a transformer and rectifiers ample for the ordinary service required of this apparatus has been provided, then the operation which occurs under such an unusual demand as that above mentioned is that the rectifier arm 8 moves in a clockwise direction until it cuts out all the resistance of the rheostat, thus increasing the voltage across the charging system to the maximum for which the system has been designed. The charging rate so provided is safe for the transformer and the rectifiers, and it builds up the charge in the batteries, even under the abnormal conditions above described, at such a rate that the batteries will be fully charged considerably in advance of the time when they normally will be taken out of the rack again by the miners. As soon as the voltage rises to a point where the maximum output of the system is no longer required, the sensitive relay 15 takes charge and regulates the voltage in the manner above described. This arrangement, however, permits the use of a smaller transformer and a lower number of rectifier disks than otherwise would be required while still performing all of the functions necessary in such a system.

While various gear reduction mechanisms may be used in the apparatus illustrated in Fig. 1, a simple and satisfactory mechanism for this purpose is illustrated in Fig. 2. In addition it includes provision for enabling a lamp house attendant to adjust the rheostat by hand, if that should prove desirable for any reason, as for example, to reset the rheostat arm to a low charge position before starting up.

Referring to said figure it will be seen that the shaft 12 on which the armatures of the two motors 10—10' or the armature of the reversible motor, if such is used, are firmly secured, carries a worm 26 fast on said shaft. It meshes with and drives a worm wheel 27 on the shaft of which is another worm 28 driving a second worm wheel 30 fast on a shaft 31. Also secured on this shaft is a pinion 32 driving a spur gear 33 fast on a shaft 34 which is coaxial with the rheostat arm shaft 13. These two shafts function as a single shaft, so far as the operation of drving the rheostat arm is concerned, but they are connected together by a slip coupling including a sleeve 35 pinned to the shaft 34 and connected with the shaft 13 by a pin 36 fixed in the shaft but slidable longitudinally in a slot 37 in the sleeve 35. The shaft 34 is slidable axially through the supporting frame plates 38 and 40 for the mechanism but is normally held in the position shown in Fig. 2 by a coiled spring 41 abutting at one end against the hub of the spur gear 33 and backed up by the plate 38.

This arrangement permits an operator to disconnect the rheostat arm 8 from its driving mechanism by pulling on the knob 42 which is fast to the end of the shaft 34, thus drawing this shaft toward the left, Fig. 2, far enough to move the spur gear 33 out of mesh with its driving pinion 32. The pin and slot arrangement 36—37 permits this movement without disturbing the normal driving relation of the shaft sections 13 and 34 to each other. When the operator has made the desired adjustment of the rheostat arm he can restore the arm again to its normal relationship with its driving mechanism simply by pushing the knob 42 toward the right, the speed of rotation of the spur gear members 32 and 33 being sufficiently slow to permit them to be re-engaged in this manner.

Figure 4:
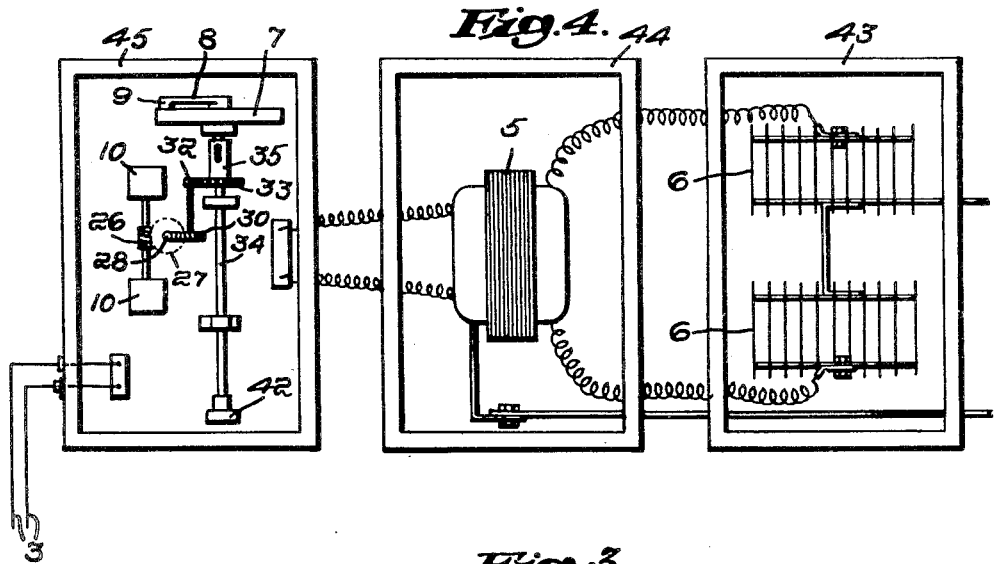
Fig. 4 is a plan view of the three main units of the apparatus in cases individual to them as they are customarily used.

Preferably the three main units of the system, namely the transformer, the rectifier, and the regulating or controlling apparatus, are mounted in separate cases for ease of transportation, installation, and making repairs or replacements. These are shown separately in Fig. 4, the rectifier casing at 43, the transformer casing at 44, and the regulator casing at 45. After the assembly of the units has been completed and they are mounted in their casings, the latter are secured together on the top of a charging rack 46 of the type above referred to, or of any suitable form. Preferably the casings themselves are made of skeleton steel construction and they are secured together on the rack by a top sheet of steel, suitable provision being made for ventilation. The regulator casing 45 has a swinging door 47 to afford access to the knob 42. Only one control unit need be exposed on the outside of the casing, namely the line switch 48, through which one side of the alternating current supply line 3 is lead, the other side going through the fuse receptacle 50. The supply cable itself may be led in through the hole 51 and the armor, if it has such, properly grounded to the metal shell of the casing.

The foregoing apparatus provides, I believe for the first time, a relatively simple and reliable apparatus which will perform automatically all of the essential functions required in controlling the operation of charging a number of batteries for miner's lamps without attention other than very general supervision.

When a source of direct current is available, as from a motor generator set or from a generator driven in any other manner, the control system may be simplified by eliminating the transformer and rectifier, feeding direct current to the charging circuit directly from the D. C. generator and controlling the voltage delivered by it by varying the intensity of the field of the generator.

Such an arrangement is shown diagrammatically in Fig. 6 in which parts corresponding to those illustrated in the other figures are indicated by the same, but primed, numerals. Here the batteries B' are connected in parallel in the charging circuit 2', and current is supplied to the latter by the generator 52 driven in any suitable manner. The selecting relay 15' is connected to the charging circuit in the same manner as illustrated in Fig.1 and operates in the same way to control the flow of current to the two motors 10 and 10' which, in this arrangement, will be direct current motors. Also, this control preferably is produced through delayed action relays similar to those illustrated in Fig. 1 at 16 and 18, and also through limit switches 20 and 21 arranged exactly as above described. In fact, the entire apparatus in the casing 45, Fig. 4, but modified to handle direct current, is employed in the present system and is similarly housed in the casing 45'.

In this arrangement, however, the rheostat 7' is connected in series with the generator field coil 53 so that when the rheostat arm 8' is at the left-hand limit of its swing, all of the resistance of the rheostat will be cut out and the generator will produce its maximum voltage. This would be the condition, for example, when substantially the full capacity of the generator is required to charge a rack full of batteries. As the charging operation nears completion, or as batteries are removed from the rack, thus reducing the load on the generator and tending to raise the voltage, the arm 8' will be swung in a clockwise direction automatically, thus cutting in more resistance into the field circuit, reducing the intensity of the field of the generator, and correspondingly reducing the voltage delivered to the charging bus bars 2'—2'.

Thus the control apparatus can be used to regulate the voltage of the generator with the same accuracy that it controls the voltage delivered by the rectifier unit in the arrangement shown in Figs. 1 to 5. The only change required is the selection of a suitable winding for the rheostat to conform to the requirements of the generator used.

When the rheostat arm 8' reaches either limit of its swing, it operates one of the switches 20 or 21 to open the circuit of the motor 10 or 10' which has been operating it, just as above described in connection with Figs. 1 to 5.

It may here be noted that the support 48, Fig. 1, of my Patent No. 2,312,614 usually occupies a forwardly inclined position as shown at 48a, Fig. 5, of this application, the head pieces being mounted at the lower side of this support.

While I have herein shown and described this invention as embodied in apparatus designed particularly for charging miner's lamps of the character disclosed in my earlier patent above refered to, it should be understood that this disclosure has been made rather by way of explanation than limitation, and that the invention is susceptible of being embodied in other forms which will operate satisfactorily with lamps of the type just described, or with miners' lamps of other makes, while still working within the spirit and scope of this invention.

Having thus described my invention, what I desire to claim as new is:

1. In an apparatus for charging storage batteries from an alternating current supply circuit, the combination of a transformer, rectifying means connected with the secondary of said transformer, a circuit for charging the batteries in parallel, the latter circuit being supplied with rectified current from said secondary, and means operating automatically in response to variations in the voltage of the charging circuit for adjusting the voltage delivered to it so as to correct the variations which otherwise would occur in the voltage of the charging circuit due to changes in the load applied to the latter circuit, said means including a variable resistor element connected into the primary of the transformer, power driven means for moving the resistor element, a selector relay for controlling the power driven means, and said power driven means being manually operable independently of the selector relay.

2. In an apparatus for charging storage batteries from an alternating supply circuit, the combination with a transformer, a charging circuit deriving its current from the secondary of said transformer, means responsive to changes in the potential across said charging circuit for automatically adjusting the voltage so supplied to it inversely to variations in the charging circuit voltage and thereby maintaining the latter voltage approximately constant, said automatic adjusting means comprising a rheostat connected in circuit with the primary of said transformer and including an adjustable element movable in opposite directions, power-driven means connected with said element to move it in both directions, controlling mechanism for said power-driven means comprising a sensitive relay connected across said charging circuit and thereby responsive to variations in the potential of said circuit, parts cooperating with said relay to control selectively the application of power to said power-driven means to operate said element in either direction required to correct the charging circuit voltage, and a construction including means associated with said relay to delay operation of the power-driven means.

3. In an apparatus for charging storage batteries from an alternating supply circuit, the combination with a transformer, a charging circuit deriving its current from the secondary of said transformer, means responsive to changes in the potential across said charging circuit for automatically adjusting the voltage so supplied to it inversely to variations in the charging circuit voltage and thereby maintaining the latter voltage approximately constant, said automatic adjusting means comprising a rheostat connected in circuit with the primary of said transformer and including an adjustable element movable in opposite directions, power-driven means connected with said element to move it in both directions, controlling mechanism for said power-driven means comprising a sensitive relay connected across said charging circuit and thereby responsive to variations in the potential of said circuit, parts cooperating with said relay to control selectively the application of power to said power-driven means to operate said element in either direction required to correct the charging circuit voltage, and a construction including one or more delayed action relays in the current supply circuit for said power-driven means.

4. In an apparatus for charging storage batteries from an alternating supply circuit, the combination with a transformer, a charging circuit deriving its current from the secondary of said transformer, means responsive to changes in the potential across said charging circuit for automatically adjusting the voltage so supplied to it inversely to variations in the charging circuit voltage and thereby maintaining the latter voltage approximately constant, said automatic adjusting means comprising a rheostat connected in circuit with the primary of said transformer and including an adjustable element movable in opposite directions, power-driven means connected with said element to move it in both directions, controlling mechanism for said power-driven means comprising a sensitive relay connected across said charging circuit and thereby responsive to variations in the potential of said circuit, parts cooperating with said relay to control selectively the application of power to said power-driven means to operate said element in either direction required to correct the charging circuit voltage, a construction including a shaft on which said adjusting element is mounted for rotation, said shaft being driven by said power-driven means, and manual means connected with said shaft and operable to disconnect it from said power-driven means so that the adjusting element may be operated by hand.

GRANT WHEAT.

REFERENCES CITED

The following references are of record in the file of this patent:

UNITED STATES PATENTS

| Number | Name | Date |
|---|---|---|
| 960,734 | Thomson | June 7, 1910 |
| 1,194,500 | Horton | Aug. 15, 1916 |
| 1,205,181 | Fessenden, Jr. | Nov. 21, 1916 |
| 1,248,074 | Carr | Nov. 27, 1917 |
| 1,425,689 | Powell | Aug. 15, 1922 |
| 1,479,561 | Stoekle | Jan. 1, 1924 |
| 1,494,397 | Wheat | May 20, 1924 |
| 1,605,345 | Hawkins | Nov. 2, 1926 |
| 1,717,831 | Borland et al. | June 18, 1929 |
| 1,802,483 | Siragusa | Apr. 28, 1931 |
| 1,805,140 | Graybill | May 12, 1931 |
| 1,829,427 | Wensley | Oct. 27, 1931 |
| 2,018,716 | Gude | Oct. 29, 1935 |
| 2,235,330 | Pugh | Mar. 18, 1941 |
| 2,312,614 | Wheat | Mar. 2, 1943 |
| 2,375,866 | Nelms et al. | May 15, 1945 |